US012785069B2

(12) United States Patent
Fujioka

(10) Patent No.: US 12,785,069 B2
(45) Date of Patent: Nov. 3, 2026

(54) SECONDARY BATTERY AND METHOD FOR MANUFACTURING THE SAME

(71) Applicant: Murata Manufacturing Co., Ltd., Nagaokakyo (JP)

(72) Inventor: Masato Fujioka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 463 days.

(21) Appl. No.: 18/435,165

(22) Filed: Feb. 7, 2024

(65) Prior Publication Data

US 2024/0243250 A1 Jul. 18, 2024

Related U.S. Application Data

(63) Continuation of application No. PCT/JP2022/035158, filed on Sep. 21, 2022.

(30) Foreign Application Priority Data

Sep. 21, 2021 (JP) ................................ 2021-153524

(51) Int. Cl.

| | |
|---|---|
| ***H01M 4/139*** | (2010.01) |
| ***H01M 4/02*** | (2006.01) |
| ***H01M 4/04*** | (2006.01) |
| ***H01M 4/13*** | (2010.01) |
| ***H01M 10/04*** | (2006.01) |
| ***H01M 10/44*** | (2006.01) |

(52) U.S. Cl.

CPC ......... *H01M 4/139* (2013.01); *H01M 4/0404* (2013.01); *H01M 4/13* (2013.01); *H01M 10/049* (2013.01); *H01M 10/446* (2013.01); *H01M 2004/021* (2013.01)

(58) Field of Classification Search

CPC ...... H01M 4/139; H01M 4/0404; H01M 4/13; H01M 10/049; H01M 10/446; H01M 2004/021

See application file for complete search history.

(56) References Cited

U.S. PATENT DOCUMENTS

2004/0241540 A1 12/2004 Tsutsumi et al.
2014/0170524 A1 6/2014 Chiang et al.
2020/0052276 A1 2/2020 Song et al.
(Continued)

FOREIGN PATENT DOCUMENTS

JP 2011228188 A 11/2011
JP 2013254678 A 12/2013
JP 2016500465 A 1/2016
(Continued)

OTHER PUBLICATIONS

International Search Report in PCT/JP2022/035158, mailed Nov. 22, 2022, 3 pages.

*Primary Examiner* — Sarah A. Slifka
(74) *Attorney, Agent, or Firm* — ArentFox Schiff LLP

(57) ABSTRACT

A secondary battery that includes: a semi-solid electrode including an electrode active material, a conductive aid including conductive particles, and an electrolytic solution; and a separator in contact with the semi-solid electrode, in which a minimum particle diameter $D5_P$ (μm) of the conductive particles included in the semi-solid electrode is larger than a maximum pore diameter D95 (μm) of an intermediate layer region of the separator.

20 Claims, 1 Drawing Sheet

(56) References Cited

U.S. PATENT DOCUMENTS

| | | | |
|---|---|---|---|
| 2021/0028436 | A1 | 1/2021 | Tanaka et al. |
| 2021/0384497 | A1 | 12/2021 | Nakano et al. |

FOREIGN PATENT DOCUMENTS

| | | | |
|---|---|---|---|
| JP | 2019175703 | A | 10/2019 |
| JP | 2019186009 | A | 10/2019 |
| JP | 2019536230 | A | 12/2019 |
| JP | 2020061332 | A | 4/2020 |
| WO | 03028142 | A1 | 4/2003 |

SECONDARY BATTERY AND METHOD FOR MANUFACTURING THE SAME

CROSS REFERENCE TO RELATED APPLICATIONS

The present application is a continuation of International application No. PCT/JP2022/035158, filed Sep. 21, 2022, which claims priority to Japanese Patent Application No. 2021-153524, filed Sep. 21, 2021, the entire contents of each of which are incorporated herein by reference.

TECHNICAL FIELD

The present invention relates to a secondary battery, particularly to a secondary battery including a semi-solid electrode, and a method for manufacturing the secondary battery.

BACKGROUND ART

Conventionally, secondary batteries have been used as power sources for various electronic devices. Secondary batteries generally have a structure where a stacked body obtained by alternately stacking a positive electrode including a positive electrode material and a negative electrode including a negative electrode material with a separator interposed therebetween and an electrolyte are housed in an exterior body. In addition, binder-bonded electrodes that have an electrode active material, a conductive aid, and the like bonded with a binder on a current collector are used as electrodes such as the positive electrode and the negative electrode.

In contrast, for the purposes of simplifying and reducing manufacturing costs, reducing inert components in electrodes and secondary batteries, and making improvements in energy density, charge capacity, and overall performance, secondary batteries with fluid semi-solid electrodes used instead of the binder-bonded electrodes are known (for example, Patent Document 1).

Patent Document 1: Japanese Translation of PCT International Application Publication No. 2016-500465

SUMMARY OF THE INVENTION

The inventor of the present invention has found that the conventional secondary batteries cause the following problems.

(1) In the binder-bonded electrodes, because the binders are present in relatively large amounts, the presence of the binders has hindered movements of electrons and ions, and increased the electric resistances. For this reason, the rate characteristics have been deteriorated.

(2) The method for manufacturing a secondary battery including the binder-bonded electrode includes: as electrode manufacturing steps, a preparation step of preparing a coating liquid for electrode layer formation; a coating step of coating a current collector with the coating liquid for electrode layer formation; a drying step of drying the applied electrode layer; a pressing step of compressing the electrode precursor; a slitting step of cutting the electrode precursor into a desired width; and a cutting step of cutting the electrode precursor into desired dimensions to form electrode plates, and includes: as assembly steps, a welding step of connecting a tab to the electrode plates; a housing step of stacking the electrode plates such that a positive electrode plate and a negative electrode plate are alternately disposed with a separator interposed therebetween, and housing the stacked body in an exterior body; a solution injection step of injecting an electrolytic solution into the exterior body; a vacuum impregnation step of impregnating the electrode with the electrolytic solution while keeping a vacuum in the exterior body; a vacuum sealing step of sealing exterior body; a charge-discharge step of forming a solid electrolyte interface film on the surface of the negative electrode active material by an initial charge process to form a secondary battery precursor; and an aging step of aging the secondary battery precursor. This complex and long manufacturing process has increased the capital investment and manufacturing process costs, and increased the manufacturing costs of secondary batteries.

(3) In the secondary batteries including the semi-solid electrodes, when conductive particles pass through pores of separators and/or move and remain in the pores, the batteries have been short-circuited in long-term use, thereby deteriorating the cycle characteristics.

An object of the present invention is to provide a secondary battery, which is more sufficiently prevented from being short-circuited, and sufficiently excellent in rate characteristics and cycle characteristics, and a method for manufacturing the secondary battery.

Another object of the present invention is to provide a secondary battery, which is more sufficiently prevented from being short-circuited, sufficiently excellent in rate characteristics and cycle characteristics, and can be manufactured by a smaller number of manufacturing steps, and a method for manufacturing the secondary battery.

The present invention relates to a secondary battery including: a semi-solid electrode including an electrode active material, a conductive aid including conductive particles, and an electrolytic solution; and a separator in contact with the semi-solid electrode, in which a minimum particle diameter $D5_P$ (μm) of the conductive particles included in the semi-solid electrode is larger than a maximum pore diameter D95 (μm) of an intermediate layer region of the separator.

The present invention also relates to a method for manufacturing the secondary battery mentioned above, the method including: mixing an electrode active material, a conductive aid including conductive particles, and an electrolytic solution to prepare a slurry for an electrode layer; applying the slurry for the electrode layer to a current collector to form electrode plates; welding a tab to the electrode plates; stacking the electrode plates such that a positive electrode plate and a negative electrode plate are alternately disposed with a separator disposed therebetween to form a stacked body; housing the stacked body in an exterior body material; sealing the exterior body material and evacuating an inside of an exterior body; forming a solid electrolyte interface film on a surface of a negative electrode active material by an initial charge process to form a secondary battery precursor; and aging the secondary battery precursor, wherein a minimum particle diameter $D5_P$(μm) of the conductive particles included in the conductive aid is larger than a maximum pore diameter D95 (μm) of an intermediate layer region of the separator.

In the secondary battery according to the present invention, the conductive particles are kept from passing through the separator or remaining in the separator, thus allowing a short circuit of the battery and cycle characteristic deterioration thereof to be sufficiently prevented. In this regard, in consideration of excluding abnormal large pores in the vicinity of surface layers of the separator, the degree of design freedom is increased for the conductive particles and the separator.

DETAILED DESCRIPTION OF THE INVENTION

[Secondary Battery]

Figure 1:
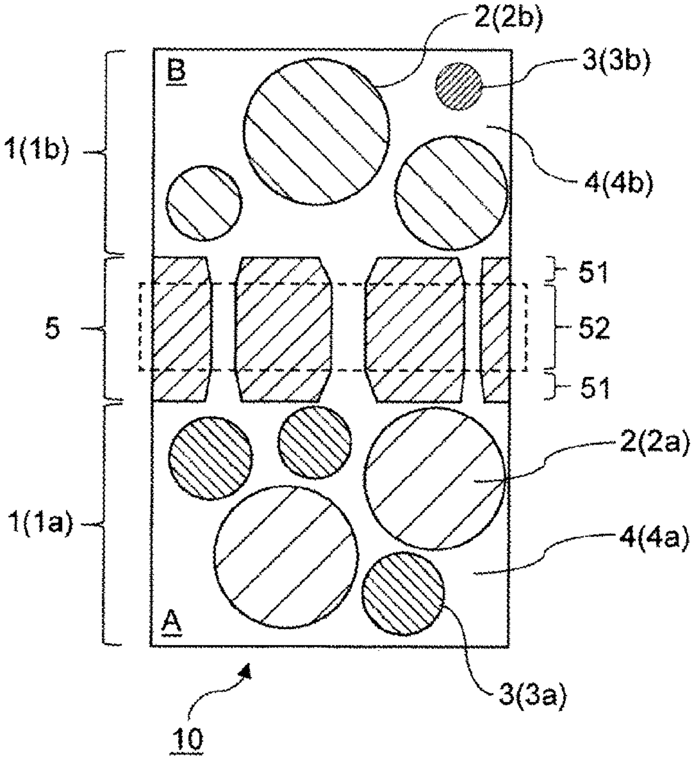
FIG. 1 is a sectional view schematically illustrating an example of a basic structure of a secondary battery for describing a relationship between the minimum particle diameter $D5_P$ (μm) of conductive particles included in a semi-solid electrode and the maximum pore diameter D95 (μm) of an intermediate layer region of a separator in the secondary battery according to an embodiment of the present invention.

The present invention provides a secondary battery. In the present specification, the term "secondary battery" refers to a battery that can be repeatedly charged and discharged. The "secondary battery" is not excessively limited by its name, and can encompass, for example, an electrochemical device such as a "power storage device". The term "plan view" as used in the present specification refers to a state (top view or bottom view) where an object is viewed from above or below (particularly above) in a thickness direction (for example, the direction of stacking electrodes and separators). The term "sectional view" as used in the present specification refers to a sectional state (sectional view) as viewed from a direction perpendicular to the thickness direction. It is to be noted that various elements illustrated in the drawings are merely illustrated schematically for the understanding of the present invention, and the dimensional ratios, appearances, and the like may be different from actual ones. The terms "vertical direction", "horizontal direction", and "front-back direction" used directly or indirectly in the present description respectively correspond to directions corresponding to the vertical direction, the horizontal direction, and the front-back direction in the drawings. Unless otherwise specified, the same reference signs or symbols denote the same members or the same semantic contents. According to a preferred aspect, it can be understood that the downward direction in the vertical direction (that is, the direction in which gravity acts) corresponds to a "downward direction", whereas the opposite direction corresponds to an "upward direction".

Hereinafter, the secondary battery of the present invention will be described in detail with reference to the drawings. In the present invention, unless otherwise specified, each of members constituting the secondary battery is disposed on each of the positive electrode side and the negative electrode side, and the members and dimensions on the positive electrode side are represented by signs including "a", whereas the members and dimensions on the negative electrode side are represented by signs including "b". For example, an electrode 1 encompasses a positive electrode 1*a* and a negative electrode 1*b*. In addition, for example, an electrode active material (or active material) 2 encompasses a positive electrode active material 2*a* and a negative electrode active material 2*b*. In addition, for example, a conductive aid 3 encompasses a positive electrode conductive aid 3*a* and a negative electrode conductive aid 3*b*. In addition, for example, an electrolytic solution 4 encompasses a positive electrode electrolytic solution 4*a* and a negative electrode electrolytic solution 4*b*. It is to be noted that electrolytic solutions that have the same composition may be used for the positive electrode electrolytic solution 4*a* and the negative electrode electrolytic solution 4*b*.

As illustrated in FIG. 1, a secondary battery 10 according to the present invention includes a semi-solid electrode 1 (1*a*, 1*b*) and a separator 5 disposed in contact with the semi-solid electrode. The semi-solid electrode 1 (1*a*, 1*b*) is typically an electrode including an electrode layer that contains the electrode active material 2 (2*a*, 2*b*), the conductive aid 3 (3*a*, 3*b*), and the electrolytic solution 4 (4*a*, 4*b*), and has fluidity, which is also referred to as a clay electrode. It is to be noted that the conductive aid 3 does not necessarily have to be contained in both the semi-solid positive electrode 1*a* and the semi-solid negative electrode 1*b*, and may be contained in one of these electrodes (particularly, the positive electrode 1*a*). For example, both the positive electrode 1*a* and the negative electrode 1*b* may each contain the conductive aid 3 (3*a*, 3*b*). For example, the positive electrode 1*a* may contain the conductive aid 3*a*, and the negative electrode 1*b* may contain no conductive aid 3*b*. For example, the positive electrode 1*a* may contain no conductive aid 3*a*, and the negative electrode 1*b* may contain the conductive aid 3*b*. The conductive aid 3 is typically contained in at least the positive electrode 1*a*. FIG. 1 is a sectional view schematically illustrating an example of a basic structure of a secondary battery according to an embodiment of the present invention.

According to the present invention, both the electrodes (that is, the positive electrode and the negative electrode) 1*a*, 1*b* are typically semi-solid electrodes. Accordingly, the positive electrode 1*a* and the negative electrode 1*b* respectively correspond to a semi-solid positive electrode 1*a* and a semi-solid negative electrode 1*b*. The term "semi-solid electrode" means that the electrode layer (particularly the substance thereof) is a mixture of a solid phase and a liquid phase, and the mixture may have the form of, for example, a slurry or a particle suspension. Accordingly, the electrode layer (that is, the semi-solid electrode layer) included in the semi-solid electrode specifically includes a slurry containing an electrode active material (typically solid phase particles) and an electrolytic solution (typically a liquid phase), and may further contain an additive such as a conductive aid (typically solid phase particles). Unlike a conventional binder-bonded electrode layer, such a semi-solid electrode layer contains no binder for bonding electrode active materials to each other and/or mutually fixing the materials. According to the present invention, the electrode (particularly the electrode layer) does not contain such a binder, thereby allowing an increase in electric resistance caused by the binder to be avoided, and allowing a further increase in the capacity of the secondary battery to be achieved. In the present invention, the semi-solid electrode (particularly the semi-solid electrode layer) is not strictly prohibited to contain a binder. The present invention is not intended to hinder the inclusion of a trace amount of binder as an impurity unintentionally mixed into the electrode layer in the manufacturing process and an integration accelerator (particularly a binder), which will be described later, for integrating the conductive aid with the surface of the electrode active material. From such a viewpoint, the content of the binder contained in the semi-solid electrode (particularly the semi-solid electrode layer) may be 0.1% by mass or less, particularly 0.01% by mass or less with respect to the total amount of the semi-solid electrode layer. The content of the binder may fall within the above-mentioned range in each of the semi-solid positive electrode layer and the semi-solid negative electrode layer (particularly, the semi-solid positive electrode layer). The binder is a binder that plays a role of connecting the electrode active materials, the electrode active material/conductive aid, and the electrode active material/current collector in the electrode layer. The binder is typically a polymer that has a weight average molecular weight of 1,000 or more (for example, 5,000 or more), particularly 10,000 or more.

According to the present invention, the semi-solid electrode and the separator disposed in direct contact with the semi-solid electrode have the following specific particle-pore diameter relationship (hereinafter, which may be referred to simply as a "specific particle-pore diameter relationship").

The "specific particle-pore diameter relationship" refers to a relationship between the minimum particle diameter $D5_P$ (μm) of the conductive particles included in the semi-solid electrode (particularly, the semi-solid electrode layer thereof) and the maximum pore diameter D95 (μm) of the separator disposed in contact with the semi-solid electrode layer, and specifically, the minimum particle diameter $D5_P$ (μm) of the conductive particles is larger than the maximum pore diameter D95 (μm) of the separator. For this reason, the conductive particles are more sufficiently prevented from passing through the separator or remaining in the separator, thus allowing a short circuit of the secondary battery and cycle characteristic deterioration thereof to be sufficiently prevented. When the minimum particle diameter $D5_P$ (μm) of the conductive particles is equal to or less than the maximum pore diameter D95 (μm) of the separator, the conductive particles pass through the separator and/or remain in the separator unless the conductive particles (particularly, the conductive aid) are integrated with the surface of the electrode active material and used, thus causing a short circuit of the secondary battery and deteriorating cycle characteristics thereof.

The conductive particles refer to the conductive aid (including, for example, primary particles, agglomerated particles, or mixtures thereof) included in the semi-solid electrode (particularly, the semi-solid electrode layer thereof), integrated particles of the conductive aid integrated with the surface of the electrode active material, or a mixture thereof. The conductive particles particularly refer to the conductive aid (including, for example, primary particles, agglomerated particles, or mixtures thereof) included in a semi-solid electrode (particularly, the semi-solid electrode layer thereof) or integrated particles of the conductive aid integrated with the surface of the electrode active material. The conductive particles typically contain no single electrode active material.

The minimum particle diameter $D5_P$ (μm) of the conductive particles refers to the value of the minimum particle diameter D5 of the conductive particles. D5 is a particle diameter at which the integrated particle volume from the small particle diameter side reaches 5% of the total particle volume in a particle size distribution determined by a laser diffraction/scattering method. Thus, D5 (μm) refers to the above-mentioned predetermined particle diameter at which the cumulative frequency obtained by accumulating the frequency from the minimum particle diameter of the conductive particles to the predetermined particle diameter is 5%. Accordingly, D5 is a particle diameter that is relatively close to the minimum particle diameter.

The minimum particle diameter $D5_P$ (μm) of the conductive particles can be measured by determining a particle size distribution by a laser diffraction/scattering method with the use of the semi-solid electrode layer taken out from the secondary battery as a sample. The particle size distribution measuring apparatus is not particularly limited as long as the apparatus is a measuring apparatus with the use of a laser diffraction/scattering method, and for example, a commercially available LA-960 (manufactured by HORIBA, Ltd.) can be used. Further, while parts of respective particle size distributions of the materials such as the conductive aid and the electrode active material are typically shown to be overlapped with each other for the particle size distribution to be measured, the minimum particle diameter $D5_P$ (μm) of the conductive particles can be measured by decomposing the distribution into the particle size distribution of each of the materials and specifying the material constituting each of the particle size distributions. In addition, when large overlaps with the particle size distributions make it difficult to decompose the particle size distribution, the particle size distribution can be also measured after diluting the electrode with an organic solvent such as NMP and separating into the respective materials with the use of differences in particle specific gravity.

The minimum particle diameter $D5_P$ (μm) of the conductive particles can be controlled by adjusting D5 of the conductive aid used. For example, the use of a conductive aid that is larger in D5 allows the minimum particle diameter $D5_P$ (μm) of the conductive particles to be further increased. In addition, for example, the use of a conductive aid that is smaller in D5 allows the minimum particle diameter $D5_P$ (μm) of the conductive particles to be further reduced. In particular, when the conductive aid is used integrally with the surface of the electrode active material as described later, the use of an electrode active material that is larger in D5 allows the minimum particle diameter $D5_P$ (μm) of the conductive particles to be further increased. In this case, the use of an electrode active material that is smaller in D5 allows the minimum particle diameter $D5_P$ (μm) of the conductive particles to be further reduced. Further, D5 of the conductive aid and D5 of the electrode active material can be controlled by classification. For example, the removal of small-diameter particles from the conductive aid by classification allows the minimum particle diameter $D5_P$(μm) of the conductive particles to be further increased. In addition, for example, the removal of large-diameter particles from the conductive aid by classification allows the minimum particle diameter $D5_P$ (μm) of the conductive particles to be further reduced.

The maximum pore diameter D95 (μm) of the separator refers to the maximum pore diameter D95 (μm) of an intermediate layer region in the separator. As illustrated in FIG. 1, the intermediate layer region is a region 52 excluding surface layers 51 at the front and back surfaces of the separator 5 in a section parallel to the thickness direction of the separator 5. Specifically, as illustrated in FIG. 1, the intermediate layer region is a region 52 obtained by removing regions 51 corresponding to 15% of the thickness of the separator at each of both ends in the thickness direction in a section parallel to the thickness direction of the separator 5. As described above, considering the maximum pore diameter of the separator excluding the abnormal large pores of the surface layers 51 of the separator 5, the degree of design freedom is increased for the conductive particles and the separator. The "regions 51 corresponding to 15% of the thickness of the separator" refers to the "regions 51 corresponding to 15% of the thickness of the separator in the completed secondary battery".

The maximum pore diameter D95 (μm) of such an intermediate layer region 52 in the separator is a pore diameter at which the integrated pore volume from the small diameter side reaches 95% of the total pore volume in a pore size distribution determined by image analysis (for example, image analysis by software "ImageJ"), based on a sectional image obtained by SEM observation. Thus, D95 (μm) refers to the above-mentioned predetermined pore diameter at which the cumulative frequency obtained by accumulating the frequency from the minimum diameter of the pore diameters of the separator to the predetermined pore diameter is 95%. Accordingly, D95 is a pore diameter that is relatively close to the maximum pore diameter.

The maximum pore diameter D95 (μm) of the separator can be measured by, with the use of the separator taken out from the secondary battery as a sample, extracting a section of the separator by FIB processing (Focused Ion Beam: focused ion beam) while cooling, and determining a pore size distribution by image analysis of a sectional image (particularly, intermediate layer region) based on SEM observation. The pore size distribution measuring apparatus is not particularly limited, and for example, commercially available ImageJ (Wayne Rasband (NIH)) can be used. The measurement target range of the pore size distribution is preferably a range that has the thickness of the intermediate layer region excluding the upper and lower 15% regions and a width of 100 μm or more in the direction perpendicular to the thickness direction.

The minimum particle diameter $D5_P$ (μm) of the conductive particles and the maximum pore diameter D95 (μm) of the separator desirably satisfy the following relationship from the viewpoints of further sufficiently preventing a short circuit and further improving the rate characteristics and the cycle characteristics:

Preferably, $0.1 \leq D5_P - D95 \leq 10$;

More preferably, $0.2 \leq D5_P - D95 \leq 9$;

Still more preferably, $1 \leq D5_P - D95 \leq 9$;

Particularly preferably, $5 \leq D5_P - D95 \leq 8$.

The minimum particle diameter $D5_P$ of the conductive particles is not particularly limited, may be, for example, 0.3 μm to 15 μm, and is preferably 0.5 μm to 12 μm, more preferably 1 μm to 10 μm, still more preferably 3 μm to 10 μm, particularly preferably 5 μm to 10 μm from the viewpoints of further sufficiently preventing a short circuit and further improving the rate characteristics and the cycle characteristics.

The maximum pore diameter D95 of the separator is not particularly limited, may be, for example, 0.2 μm to 5 μm, and is preferably 0.2 μm to 4 μm, more preferably 0.2 μm to 3 μm, still more preferably 0.5 μm to 3 μm, particularly preferably 0.5 μm to 2 μm, from the viewpoints of further sufficiently preventing a short circuit and further improving the rate characteristics and the cycle characteristics.

The above-mentioned semi-solid electrode that has the "specific particle-pore diameter relationship" and the separator disposed in contact with the semi-solid electrode respectively correspond to the semi-solid electrode layer that has the "specific particle-pore diameter relationship" and the separator disposed in contact with the semi-solid electrode layer.

The semi-solid electrode typically has a current collector, and has a semi-solid electrode layer on at least one surface of the current collector.

For example, when the semi-solid electrode has a current collector and a semi-solid electrode layer disposed on only one surface of the current collector, the "specific particle-pore diameter relationship" may be achieved between the semi-solid electrode layer and a separator disposed in contact with the semi-solid electrode layer.

Alternatively, for example, when the semi-solid electrode has a current collector and semi-solid electrode layers disposed on both surfaces of the current collector, the "specific particle-pore diameter relationship" may be achieved between at least one of the semi-solid electrode layers and a separator disposed in contact with the semi-solid electrode layer. In this case, the "specific particle-pore diameter relationship" is preferably achieved between one of the semi-solid electrode layers and a separator disposed in contact with the semi-solid electrode layer, and between the other semi-solid electrode layer and a separator disposed in contact with the semi-solid electrode layer, from the viewpoints of further sufficiently preventing a short circuit and further improving the rate characteristics and cycle characteristics.

The above-mentioned "specific particle-pore diameter relationship" may be achieved between at least one of the semi-solid positive electrode and the semi-solid negative electrode (particularly the electrode layer thereof) and the separator disposed in contact with the electrode (particularly the electrode layer thereof). According to the present invention, the conductive aid may be contained in at least one of the semi-solid positive electrode (particularly the electrode layer thereof) or the semi-solid negative electrode (particularly the electrode layer thereof). In addition, the average particle size of the conductive aid is typically much smaller than the average particle size of the electrode active material. In particular, D5 of the conductive aid is typically much smaller than D5 of the electrode active material. Accordingly, the present invention encompasses the following embodiments, depending on the component compositions of the semi-solid positive electrode and semi-solid negative electrode:

Embodiment 1

When the conductive aid is included in both the electrodes of the positive electrode and the negative electrode, the specific particle-pore diameter relationship is achieved in any one of the following forms (A) to (C), and is preferably achieved in the form (A) or (B), more preferably achieved in the form (A), from the viewpoints of further sufficient preventing a short circuit and further improving the rate characteristics and the cycle characteristics:

Form (A): between the positive electrode and a separator disposed in contact with the positive electrode, and between the negative electrode and a separator disposed in contact with the negative electrode;

Form (B): between the positive electrode and a separator disposed in contact with the positive electrode; (in this regard, the specific particle-pore diameter relationship may fail to be achieved between the negative electrode and a separator disposed in contact with the negative electrode); and Form (C): between the negative electrode and a separator disposed in contact with the negative electrode; (in this regard, the specific particle-pore diameter relationship may fail to be achieved between the positive electrode and a separator disposed in contact with the positive electrode).

Embodiment 2

When the conductive aid is included in the positive electrode but not included in the negative electrode, the specific particle-pore diameter relationship is preferably achieved in the form (B) from the viewpoints of further sufficiently preventing a short circuit and further improving the rate characteristics and the cycle characteristics.

Embodiment 3

When the conductive aid is included in the negative electrode but not included in the positive electrode, the specific particle-pore diameter relationship is preferably achieved in the form (C) from the viewpoints of further sufficiently preventing a short circuit and further improving the rate characteristics and the cycle characteristics.

In the present invention, from the viewpoints of further sufficiently preventing a short circuit and further improving the rate characteristics and cycle characteristics, Embodiments 1 and 2 are preferred, and Embodiment 1 is more preferred.

The positive electrode active material 2*a* included in the positive electrode 1*a* and the negative electrode active material 2*b* included in the negative electrode 1*b* are materials directly involved in transfer of electrons in the secondary battery, and are main positive and negative electrode materials responsible for charge-discharge, that is, a battery reaction. More specifically, ions are brought into the electrolyte due to "the positive electrode active material included in the positive electrode" and "the negative electrode active material included in the negative electrode", and such ions move between the positive electrode and the negative electrode to transfer electrons, thereby leading to charge-discharge. Such mediating ions are not particularly limited as long as charge-discharge can be performed, and examples thereof include lithium ions and sodium ions (particularly lithium ions). The positive electrode and the negative electrode may be electrodes capable of particularly occluding and releasing lithium ions. More specifically, the secondary battery according to the present invention may be a secondary battery that is charged and discharged by movements of lithium ions between the positive electrode active material and the negative electrode active material through the electrolytic solution. When lithium ions are involved in charge-discharge, the secondary battery according to the present invention corresponds to a so-called "lithium ion battery".

The positive electrode active material 2*a* of the positive electrode 1*a* is preferably made of, for example, a granular material. Furthermore, the conductive aid is preferably also contained in the positive electrode (particularly positive electrode layer) for facilitating the transmission of electrons that promote the battery reaction. Similarly, the negative electrode active material 2*b* of the negative electrode 1*b* is preferably made of, for example, a granular material, and the conductive aid may be contained in the negative electrode (particularly the negative electrode layer) for facilitating the transmission of electrons that promote the battery reaction. As described above, the positive electrode layer and the negative electrode layer can, because of containing the multiple components, also be referred to respectively as a "positive electrode mixture layer" and a "negative electrode mixture layer".

The positive electrode active material 2*a* may be a material that contributes to occlusion and release of lithium ions. From such a viewpoint, the positive electrode active material may be, for example, a lithium-containing composite oxide. More specifically, the positive electrode active material may be a lithium-transition metal composite oxide containing lithium and at least one transition metal selected from the group consisting of cobalt, nickel, manganese, and iron. More specifically, in the positive electrode layer of the secondary battery according to the present invention, such a lithium-transition metal composite oxide may be preferably included as a positive electrode active material. For example, the positive electrode active material may be a lithium cobaltate, a lithium nickelate, a lithium manganate, a lithium iron phosphate, or a material obtained by replacing a part of the transition metal thereof with another metal. Such positive electrode active materials may be included as a single species, or two or more species thereof may be included in combination. According to a more preferred aspect, the positive electrode active material included in the positive electrode (particularly the positive electrode layer) is a lithium cobaltate.

The average particle size of the positive electrode active material is not particularly limited, may be, for example, 1 μm to 100 μm, particularly 1 μm to 50 μm, and is preferably 1 μm to 30 μm, more preferably 10 μm to 20 μm, from the viewpoints of further sufficiently preventing a short circuit and further improving the rate characteristics and the cycle characteristics.

The average particle size of the positive electrode active material is a particle diameter D50 at which the integrated particle volume from the small particle diameter side reaches 50% of the total particle volume in a particle size distribution determined by a laser diffraction/scattering method. The particle size distribution for measuring the average particle size of the positive electrode active material can be measured with a measuring apparatus that is similar to the particle size distribution measuring apparatus for measuring the minimum particle diameter $D5_P$ of the conductive particles mentioned above.

The minimum particle diameter $D5_M$ of the positive electrode active material may be typically 0.5 μm to 50 μm, particularly 1 μm to 40 μm, and is preferably 2 μm to 20 μm, more preferably 4 μm to 15 μm from the viewpoints of further sufficiently preventing a short circuit and further improving the rate characteristics and the cycle characteristics.

The minimum particle diameter $D5_M$ (μm) of the positive electrode active material refers to the value of the minimum particle diameter D5 of the positive electrode active material. The D5 is, as with the minimum particle diameter $D5_P$ of the conductive particles, a particle diameter at which the integrated particle volume from the small particle diameter side reaches 5% of the total particle volume in a particle size distribution determined by a laser diffraction/scattering method.

The minimum particle diameter $D5_M$ (μm) of the positive electrode active material can be measured by the same method as for the minimum particle diameter $D5_P$ of the conductive particles, except that the positive electrode active material is used as a sample.

The content of the positive electrode active material is typically 50% by weight to 90% by weight with respect to the total amount of the positive electrode layer, and is preferably 70% by weight to 90% by weight from the viewpoints of further sufficiently preventing a short circuit and further improving the rate characteristics and the cycle characteristics.

The conductive aid can be included in the positive electrode 1*a* is not to be considered particularly limited, and examples thereof include at least one selected from carbon blacks such as thermal black, furnace black, channel black, Ketjen black, and acetylene black, graphite, carbon fibers such as carbon nanotubes and vapor-grown carbon fibers, metal powders such as copper, nickel, aluminum, and silver, polyphenylene derivatives, and the like. According to a more preferred aspect, the conductive aid of the positive electrode layer is carbon black. According to a further preferred aspect, the positive electrode active material and conductive aid of the positive electrode layer are a combination of lithium cobaltate and carbon black.

The average particle size of the conductive aid included in the positive electrode (particularly the positive electrode layer) is not particularly limited, and may be, for example, 0.1 μm to 20 μm, particularly 0.1 μm to 10 μm, and is preferably 0.5 μm to 8 μm, more preferably 1 μm to 5 μm from the viewpoints of further sufficiently preventing a short circuit and further improving the rate characteristics and the cycle characteristics.

The average particle size of the conductive aid included in the positive electrode (particularly the positive electrode layer) is a particle diameter D50 at which the integrated particle volume from the small particle diameter side reaches 50% of the total particle volume in a particle size distribution determined by a laser diffraction/scattering method. The particle size distribution for measuring the average particle size of the conductive aid can be measured with a measuring apparatus that is similar to the particle size distribution measuring apparatus for measuring the minimum particle diameter $D5_P$ of the conductive particles mentioned above.

The minimum particle diameter $D5_A$ of the conductive aid included in the positive electrode (particularly the positive electrode layer) may be typically 0.01 μm to 10 μm, particularly 0.05 μm to 5 μm, and is preferably 0.1 μm to 4 μm, more preferably 0.1 μm to 2 μm, particularly preferably 0.1 μm to 0.5 μm from the viewpoints of further sufficiently preventing a short circuit and further improving the rate characteristics and the cycle characteristics.

The minimum particle diameter $D5_A$ (μm) of the conductive aid included in the positive electrode (particularly the positive electrode layer) refers to the minimum particle diameter D5 value of the conductive aid. The D5 is, as with the minimum particle diameter $D5_P$ of the conductive particles, a particle diameter at which the integrated particle volume from the small particle diameter side reaches 5% of the total particle volume in a particle size distribution determined by a laser diffraction/scattering method.

The minimum particle diameter $D5_A$ (μm) of the conductive aid included in the positive electrode (particularly the positive electrode layer) can be measured by the same method as for the minimum particle diameter $D5_P$ of the conductive particles, except that the conductive aid included in the positive electrode (particularly the positive electrode layer) is used as a sample.

The content of the conductive aid included in the positive electrode (particularly the positive electrode layer) is typically 0.1% by weight to 10% by weight with respect to the total amount of the positive electrode layer, and is preferably 0.5% by weight to 5% by weight, more preferably 1% by weight to 3% by weight from the viewpoints of further sufficiently preventing a short circuit and further improving the rate characteristics and the cycle characteristics.

Figure 2:
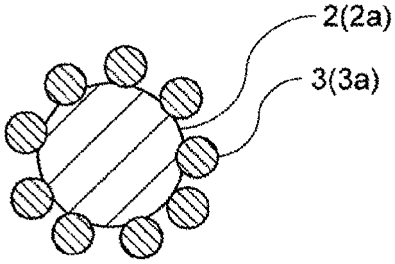
FIG. 2 is a sectional view schematically illustrating an integrated product of an active material and a conductive aid for showing a relationship between an active material and a conductive aid that may be included in a secondary battery according to another embodiment of the present invention.

When the conductive aid included in the positive electrode (particularly the positive electrode layer) has a minimum particle diameter $D5_A$ (μm) that is equal to or less than the maximum pore diameter D95 (μm) of the separator disposed in contact with the positive electrode layer, the conductive aid preferably constitutes integrated particles of the conductive aid 3 (3*a*) integrated with the surface of the electrode active material 2 (positive electrode active material 2*a*) as illustrated in FIG. 2. This is because the use of the conductive aid attached to and integrated with the surface of the electrode active material (positive electrode active material) allows the "specific particle-pore diameter relationship" to be satisfied also in the case of using the conductive aid with the minimum particle diameter $D5_A$ (μm) equal to or less than the maximum pore diameter of the separator. In this regard, the conductive aid with a smaller minimum particle diameter $D5_A$ (μm) can be used, and thus, the surface area of the conductive aid to be used is larger with the same use weight. As a result, the electron conductivity in the electrode is improved, and the electron resistance can be reduced. FIG. 2 is a sectional view schematically illustrating an integrated product of an active material and a conductive aid for showing a relationship between an active material and a conductive aid that may be included in a secondary battery according to the present invention.

The integrated particles of the conductive aid 3 integrated with (and/or immobilized on) the surface of the electrode active material 2 can be obtained by subjecting a mixture of the electrode active material 2 and the conductive aid 3 to a mechanochemical treatment. The mechanochemical treatment is a treatment of forming a physical and/or chemical bond between the electrode active material and the conductive aid by applying mechanical energy (for example, shear force, impact force, grinding force, and the like) to a mixture of the electrode active material 2 and the conductive aid 3. The mechanochemical treatment may be, for example, a mixing treatment, a grinding treatment, or a stirring treatment.

Examples of the apparatus for performing the mechanochemical treatment include any apparatus (for example, a so-called mixing apparatus, grinding apparatus or stirring apparatus) as long as the apparatus can transmit mechanical energy, and for example, the mechanochemical treatment can be performed with the use of an apparatus such as NOBILTA manufactured by HOSOKAWA MICRON CORPORATION.

The mixture to be subjected to the mechanochemical treatment may further include an integration accelerator. The integration accelerator is a substance that accelerates the integration of the electrode active material and the conductive aid, and for example, a binder included in a conventional binder-bonded electrode layer is used. Examples of the integration accelerator include polymer compounds such as polyacrylonitrile, a polyvinylidene fluoride, a copolymer of vinylidene fluoride and hexafluoropropylene, polytetrafluoroethylene, polyhexafluoropropylene, a polyethylene oxide, a polypropylene oxide, polyphosphazene, polysiloxane, a polyvinyl acetate, a polyvinyl alcohol, polymethyl a methacrylate, a polyacrylic acid, a polymethacrylic acid, a styrene-butadiene rubber, a nitrile-butadiene rubber, polystyrene, and/or polycarbonate. For the integration accelerator, from the viewpoints of further sufficiently preventing a short circuit and further improving the rate characteristics and the cycle characteristics, it is preferable to use a polymer compound that is unlikely to be dissolved in the solvent of the electrolytic solution, and examples of such an integration accelerator include a polyvinylidene fluoride.

The content of the integration accelerator is an amount such that the content of the binder with respect to the total amount of the semi-solid electrode layer falls within the range with the accelerated integration of the electrode active material and the conductive aid, and may be, for example, 0.05 parts by mass to 0.13 parts by mass with respect to 100 parts by mass of the electrode active material.

The treatment conditions such as a treatment time, a treatment temperature, and a stirring speed for the mechanochemical treatment are not particularly limited as long as the conductive aid is integrated with and immobilized on the surface of the electrode active material.

The negative electrode active material 2*b* may be a material that contributes to occlusion and release of lithium ions. From such a viewpoint, the negative electrode active material may be, for example, various carbon materials, oxides, lithium alloys, or the like. Examples of the various carbon materials for the negative electrode active material include graphite (natural graphite and artificial graphite), hard carbon, soft carbon, and diamond-like carbon. In particular, graphite is preferred because of its high electron conductivity. Examples of the oxides for the negative electrode active material include at least one selected from the group consisting of a silicon oxide, a tin oxide, an indium oxide, a zinc oxide, and a lithium oxide. The lithium alloy for the negative electrode active material may be any metal that can be alloyed with lithium, and may be, for example, a binary, ternary, or higher alloy of lithium and a metal such as Al, Si, Pb, Sn, In, Bi, Ag, Ba, Ca, Hg, Pd, Pt, Te, Zn, or La. Such an oxide is preferably amorphous as its structural form. This is because deterioration due to nonuniformity such as crystal grain boundaries or defects is less likely to be caused. According to a more preferred aspect, the negative electrode active material of the negative electrode is artificial graphite.

The average particle size of the negative electrode active material is not particularly limited, and may be, for example, 0.5 μm to 50 μm, particularly 1 μm to 40 μm, and is preferably 2 μm to 30 μm, more preferably 5 μm to 20 μm from the viewpoints of further sufficiently preventing a short circuit and further improving the rate characteristics and the cycle characteristics.

The average particle size of the negative electrode active material is a particle diameter D50 at which the integrated particle volume from the small particle diameter side reaches 50% of the total particle volume in a particle size distribution determined by a laser diffraction/scattering method. The particle size distribution for measuring the average particle size of the negative electrode active material can be measured with a measuring apparatus that is similar to the particle size distribution measuring apparatus for measuring the minimum particle diameter $D5_P$ of the conductive particles mentioned above.

The minimum particle diameter $D5_M$ of the negative electrode active material may be typically 0.5 μm to 50 μm, particularly 1 μm to 40 μm, and is preferably 2 μm to 20 μm, more preferably 2 μm to 10 μm from the viewpoints of further sufficiently preventing a short circuit and further improving the rate characteristics and the cycle characteristics.

The minimum particle diameter $D5_M$ (μm) of the negative electrode active material refers to the value of the minimum particle diameter D5 of the negative electrode active material. The D5 is, as with the minimum particle diameter $D5_P$ of the conductive particles, a particle diameter at which the integrated particle volume from the small particle diameter side reaches 5% of the total particle volume in a particle size distribution determined by a laser diffraction/scattering method.

The minimum particle diameter $D5_M$ (μm) of the negative electrode active material can be measured by the same method as for the minimum particle diameter $D5_P$ of the conductive particles, except that the negative electrode active material is used as a sample.

The content of the negative electrode active material is typically 50% by weight to 70% by weight with respect to the total amount of the negative electrode layer, and is preferably 55% by weight to 65% by weight from the viewpoints of further sufficiently preventing a short circuit and further improving the rate characteristics and the cycle characteristics.

The conductive aid that can be included in the negative electrode 1*b* is not particularly limited, and examples thereof include at least one selected from carbon blacks such as thermal black, furnace black, channel black, Ketjen black, and acetylene black, carbon fibers such as carbon nanotubes, and vapor-grown carbon fibers, metal powders such as copper, nickel, aluminum, and silver, polyphenylene derivatives, and the like.

The average particle size of the conductive aid included in the negative electrode (particularly the negative electrode layer) is not particularly limited, and may be, for example, 0.1 μm to 20 μm, particularly 0.1 μm to 10 μm, and is preferably 0.5 μm to 8 μm, more preferably 1 μm to 5 μm from the viewpoints of further sufficiently preventing a short circuit and further improving the rate characteristics and the cycle characteristics.

The average particle size of the conductive aid included in the negative electrode (particularly the negative electrode layer) is a particle diameter D50 at which the integrated particle volume from the small particle diameter side reaches 50% of the total particle volume in a particle size distribution determined by a laser diffraction/scattering method. The particle size distribution for measuring the average particle size of the conductive aid can be measured with a measuring apparatus that is similar to the particle size distribution measuring apparatus for measuring the minimum particle diameter $D5_P$ of the conductive particles mentioned above.

The minimum particle diameter $D5_A$ of the conductive aid included in the negative electrode (particularly the negative electrode layer) may be typically 0.01 μm to 10 μm, particularly 0.05 μm to 5 μm, and is preferably 0.1 μm to 4 μm, more preferably 0.1 μm to 2 μm, particularly preferably 0.1 μm to 0.5 μm from the viewpoints of further sufficiently preventing a short circuit and further improving the rate characteristics and the cycle characteristics.

The minimum particle diameter $D5_A$ (μm) of the conductive aid included in the negative electrode (particularly the negative electrode layer) refers to the minimum particle diameter D5 value of the conductive aid. The D5 is, as with the minimum particle diameter $D5_P$ of the conductive particles, a particle diameter at which the integrated particle volume from the small particle diameter side reaches 5% of the total particle volume in a particle size distribution determined by a laser diffraction/scattering method.

The minimum particle diameter $D5_A$ (μm) of the conductive aid included in the negative electrode (particularly the negative electrode layer) can be measured by the same method as for the minimum particle diameter $D5_P$ of the conductive particles, except that the conductive aid included in the negative electrode (particularly the negative electrode layer) is used as a sample.

The content of the conductive aid included in the negative electrode (particularly the negative electrode layer) is typically 0% by weight to 10% by weight with respect to the total amount of the negative electrode layer, and is preferably 0% by weight to 2% by weight, more preferably 0% by weight from the viewpoints of further sufficiently preventing a short circuit and further improving the rate characteristics and the cycle characteristics. The content of the conductive aid included in the negative electrode (particularly the negative electrode layer) being 0% by weight means that the negative electrode (particularly the negative electrode layer) contains no conductive aid.

When the conductive aid included in the negative electrode (particularly the negative electrode layer) has a minimum particle diameter $D5_A$ (μm) that is equal to or less than the maximum pore diameter D95 (μm) of the separator disposed in contact with the negative electrode layer, the conductive aid preferably constitutes integrated particles of the conductive aid 3 integrated with the surface of the electrode active material 2 (negative electrode active material), as in the positive electrode (particularly the positive electrode layer). This is because the use of the conductive aid attached to and integrated with the surface of the electrode active material allows the "specific particle-pore diameter relationship" to be satisfied also in the case of using the conductive aid with the minimum particle diameter $D5_A$ (μm) equal to or less than the maximum pore diameter of the separator. In this regard, the conductive aid with a smaller minimum particle diameter $D5_A$ (μm) can be used, and thus, the surface area of the conductive aid to be used is larger with the same use weight. As a result, the electron conductivity in the electrode is improved, and the electron resistance can be reduced.

As the electrolytic solution included in the positive electrode 1*a* and the electrolytic solution included in the negative electrode 1*b*, electrolytic solutions that have the same composition are typically used.

The electrolytic solution assists movements of metal ions released from the electrode active materials (positive electrode active material and negative electrode active material). The electrolytic solution may be a "non-aqueous" electrolytic solution such as an organic electrolytic solution and an organic solvent, or may be an "aqueous" electrolytic solution containing water. The secondary battery according to the present invention is preferably a nonaqueous electrolytic solution secondary battery in which as the electrolytic solution, an electrolytic solution including a "nonaqueous" solvent and a solute is used. The electrolytic solution may have a form such as a liquid form or a gel form (in the present specification, the "liquid" nonaqueous electrolytic solution is also referred to as a "nonaqueous electrolytic solution").

The specific solvent for the nonaqueous electrolytic solution is not particularly limited, and may contain at least a carbonate. Such a carbonate may be a cyclic carbonate and/or a chain carbonate. Although not particularly limited, examples of the cyclic carbonates include at least one selected from the group consisting of a propylene carbonate (PC), an ethylene carbonate (EC), a butylene carbonate (BC), and a vinylene carbonate (VC). Examples of the chain carbonate include at least one selected from the group consisting of a dimethyl carbonate (DMC), a diethyl carbonate (DEC), an ethyl methyl carbonate (EMC), and a dipropyl carbonate (DPC). According to one preferred embodiment, a combination of a cyclic carbonate and a chain carbonate is used as the nonaqueous electrolytic solution, and for example, a mixture of an ethylene carbonate and an ethyl methyl carbonate is used.

As a specific solute for the nonaqueous electrolytic solution, for example, a Li salt such as $LiPF_6$ or $LiBF_4$ is preferably used. In a preferred aspect, $LiPF_6$ is used. The concentration of the solute in the electrolytic solution is not particularly limited, and may be, for example, 0.1 M to 10 M, particularly 0.5 M to 3 M. M means mol/L.

The contents of the electrolytic solution in the positive electrode (particularly the positive electrode layer) and the negative electrode (particularly the negative electrode layer) are not particularly limited. For example, the content of the electrolytic solution included in the positive electrode (particularly the positive electrode layer) is typically 5% by weight to 50% by weight, and may be particularly 10% by weight to 30% by weight with respect to the total amount of the positive electrode layer. In addition, for example, the content of the electrolytic solution included in the negative electrode (particularly the negative electrode layer) is typically 10% by weight to 70% by weight, and may be particularly 30% by weight to 50% by weight with respect to the total amount of the negative electrode layer.

The thickness of the electrode layer is not particularly limited, and may be selected appropriately depending on a desired battery capacity. The thickness of the electrode layer (particularly, the thickness of the electrode layer per main surface (one surface) of the current collector described later) is, for example, a thickness such that the capacity per electrode area in the secondary battery according to the present invention falls within the range described later, and may be typically 100 μm or more, particularly 150 μm to 600 μm. The thickness of the electrode layer encompasses the thickness of the positive electrode layer and the thickness of the negative electrode layer, which may be independently selected. As the thickness of the electrode layer, the average value of thicknesses at arbitrary fifty sites in the completed secondary battery is used.

Although the current collectors are omitted in FIG. 1, the electrode 1 (1*a*, 1*b*) typically also includes a current collector. The electrode (particularly the semi-solid electrode) 1 typically has an electrode layer (particularly a semi-solid electrode layer) on at least one surface (preferably both surfaces) of the current collector. The constituent material of the current collector is not particularly limited as long as the material has conductivity, and may be, for example, one metal selected from the group consisting of copper, aluminum, stainless steel, and the like, or an alloy containing two or more metals selected therefrom. The current collector of the positive electrode is preferably made of aluminum from the viewpoints of further sufficiently preventing a short circuit and further improving the rate characteristics and the cycle characteristics. The current collector of the negative electrode is preferably made of copper from the viewpoints of further sufficiently preventing a short circuit and further improving the rate characteristics and the cycle characteristics.

The thicknesses of the current collectors of the positive electrode and negative electrode are not particularly limited, and may be, independently of each other, 1 μm to 300 μm, particularly 1 μm to 100 μm.

The separator 5 is a member that is provided from the viewpoint of holding the electrolytic solution while preventing a short circuit due to contact between the positive electrode active material 2*a* in the positive electrode 1*a* and the negative electrode active material 2*b* in the negative electrode 1*b*. In other words, the separator can be considered as a member that allows ions to pass while preventing electronic contact between the positive electrode layer and the negative electrode layer. The separator 5 is not particularly limited as long as the separator 5 has such a function and has the maximum pore diameter D95 in the intermediate layer region. Preferably, the separator is a porous or microporous insulating member, and has a film form due to its small thickness. By way of example only, a microporous membrane made of a polyolefin may be used as the separator. In this respect, the microporous membrane for use as the separator may contain, for example, only polyethylene (PE) or only polypropylene (PP) as the polyolefin. Furthermore, the separator may be a stacked body composed of a "microporous membrane made of PE" and a "microporous membrane made of PP". The surface of the separator may be covered with an inorganic particle coat layer.

The thickness of the separator 5 is not particularly limited as long as the separator 5 has the maximum pore diameter D95 in the intermediate layer region, and may be, for example, 5 μm to 30 μm, and is preferably 15 μm to 25 μm from the viewpoint of further sufficiently preventing a short circuit and further improving the rate characteristics and the cycle characteristics. The thickness of the separator 5 is the thickness in the completed secondary battery.

The secondary battery according to the present invention is typically enclosed in an exterior body. The exterior body may be a flexible pouch (soft bag) or a hard case (hard housing). The exterior body is preferably a flexible pouch from the viewpoints of further sufficiently preventing a short circuit and further improving the rate characteristics and the cycle characteristics.

When the exterior body is a flexible pouch, the flexible pouch is typically formed of a laminate film, and the peripheral edge is heat-sealed to form a sealing part. As the laminate film, a film obtained by laminating a metal foil and a polymer film is common, and specifically, a three-layer film composed of an outer layer polymer film/a metal foil/an inner layer polymer film is exemplified. The outer layer polymer film is intended to prevent damage to the metal foil due to permeation and contact of moisture and the like, and polymers such as a polyamide and a polyester can be suitably used. The metal foil is intended to prevent permeation of moisture and gas, and a foil of copper, aluminum, stainless steel, or the like can be suitably used. The inner layer polymer film is intended to protect the metal foil from the electrolyte housed inside, and for melt-sealing at the time of heat sealing, and polyolefin or acid-modified polyolefin can be suitably used. The thickness of the laminate film is not particularly limited, and is preferably, for example, 1 μm to 1 mm. For example, in the case of a secondary battery that has a rectangular shape in plan view, the exterior body is typically heat-sealed at a peripheral edge thereof in plan view. Specifically, when the exterior body is composed of two rectangular exterior body materials, the exterior body is typically heat-sealed at its four sides in plan view. When the exterior body is composed of one rectangular exterior body material, one of the four sides of the exterior body in plan view is typically formed by folding back the exterior body material.

When the exterior body is a hard case, the hard case is typically formed from a metal plate, and the peripheral edge thereof is irradiated with laser to form a sealing part. As the metal plate, a metal material made of aluminum, nickel, iron, copper, stainless steel or the like is common. The thickness of the metal plate is not particularly limited, and is preferably, for example, 1 μm to 1 mm. The metal plate sealed may be achieved by irradiating an overlap thereof at the peripheral edge with laser.

The secondary battery 10 according to the present invention is effective for increasing the capacity. The electrode layer is a semi-solid electrode layer with fluidity, and thus, the thickness of the electrode layer can be stably and easily increased simply by increasing the amount of the layer injected. From such a viewpoint, the capacity per electrode area in the secondary battery according to the present invention is preferably 4 $mAh/cm^2$ or more, more preferably 5 $mAh/cm^2$ to 20 $mAh/cm^2$. It is to be noted that in the present invention, because the electrode layer is a semi-solid electrode layer, the capacity per electrode area may be the capacity per current collector area. The capacities per electrode area of the positive electrode and negative electrode may each independently fall within the range mentioned above.

The secondary battery according to the present invention may further have a protective layer (not illustrated) on the outer surface of the exterior body.

[Method for Manufacturing Secondary Battery]

The secondary battery 10 according to the present invention can be manufactured by a method including the following steps:

- a preparation step of mixing an electrode active material, a conductive aid, and an electrolytic solution to prepare a slurry for an electrode layer (that is, a slurry for a positive electrode layer and a slurry for a negative electrode layer);
- an application step of applying the slurry for the electrode layer to a current collector to form electrode plates (that is, a positive electrode plate and a negative electrode plate);
- a welding step of welding a tab to the electrode plates;
- a housing step of stacking the electrode plates such that the positive electrode plate and the negative electrode plate that constitute the electrode plates are alternately disposed with a separator disposed therebetween, and housing the stacked body in an exterior body material;
- a vacuum sealing step of sealing the exterior body material and evacuating the inside of the exterior body;
- a charge-discharge step of forming a solid electrolyte interface film on the surface of the negative electrode active material by an initial charge process to form a secondary battery precursor; and
- an aging step of aging the secondary battery precursor.

In the preparation step, specifically, a positive electrode active material, a conductive aid, an electrolytic solution, and a desired additive are mixed and dispersed to prepare a slurry for a positive electrode layer. In addition, a negative electrode active material, an electrolytic solution, and a conductive aid as desired are mixed and dispersed to prepare a slurry for a negative electrode layer.

In the application step, specifically, the slurry for the positive electrode layer is applied to a current collector for a positive electrode to form a positive electrode plate. In addition, the slurry for the negative electrode layer is applied to a current collector for a negative electrode to form a negative electrode plate. In the formation of the positive electrode plate and the negative electrode plate, independently of each other, the slurry for the electrode layer is applied to at least one surface (preferably both surfaces) of the current collector.

In the welding step, specifically, a tab for the positive electrode is welded to the positive electrode plate. In addition, a tab for the negative electrode is welded to the negative electrode plate. The materials constituting the for the positive electrode and the for the negative electrode are not particularly limited as long as the materials have conductivity, and for example, may be selected from the same materials as the constituent materials of the current collectors. The tab for the positive electrode is preferably made of aluminum from the viewpoints of further sufficiently preventing a short circuit and further improving the rate characteristics and the cycle characteristics. The tab for the negative electrode is preferably made of copper from the viewpoints of further sufficiently preventing a short circuit and further improving the rate characteristics and the cycle characteristics.

In the housing step, specifically, the positive electrode plate and the negative electrode plate are stacked such that the positive electrode plate and the negative electrode plate are alternately disposed with a separator disposed therebetween. Thereafter, the stacked body is housed in the exterior body material. It is to be noted that the housing method is not particularly limited as long as the exterior body is disposed at the uppermost site and lowermost site of the stacked body in plan view, and may be achieved by, for example, the following method (i) or (ii):

Method (i): sandwiching the stacked body between two exterior body materials; and Method (ii): housing the stacked body in a bag-shaped exterior body with an opening on one side in plan view, formed by sealing in advance.

In the method (i), one continuous exterior body material may be folded back and used, instead of the two exterior body materials.

In the vacuum sealing step, specifically, an overlap at the peripheral edge of the exterior body material is sealed, and the inside of the exterior body is evacuated. In the case of employing the method (i) in the housing step, the inside of the exterior body is brought into a vacuum state while sealing the peripheral edge of the exterior body material at an overlap thereof. In the case of employing the method (ii), the inside of the exterior body is brought into a vacuum state while sealing the opening of the bag-shaped exterior body at an overlap thereof. It is to be noted that the overlap is an overlap of the exterior body materials.

In the charge-discharge step, specifically, a solid electrolyte interface (Solid Electrolyte Interface) film (hereinafter, referred to as an "SEI film") is formed on the surface of the negative electrode active material by an initial charge process.

The initial charge process is a first charge process performed for the purpose of forming the SEI film on the surface of the negative electrode active material, and is also referred to as a conditioning process or a formation process. The SEI film is formed by reductive decomposition of the additive included in the electrolytic solution on the surface of the negative electrode active material in this process, and prevents further decomposition of the additive on the surface of the negative electrode active material in use as a secondary battery. The SEI film typically contains one or more materials selected from a group consisting of LiF, $Li_2CO_3$, LiOH, and LiOCOOR (where R represents a monovalent organic group, such as an alkyl group). Such an SEI film is formed more uniformly on the surface of the negative electrode active material, thereby preventing the electrolyte component from being decomposed in the secondary battery, and allowing the stabilized capacity and extended life of the secondary battery to be achieved.

The initial charge process requires charging at least once. Typically, charge-discharge is performed one or more times. Single charge-discharge includes single charge and single discharge after the charge. In the case of performing charge-discharge two or more times, the charge-discharge is repeated the number of times. The number of times of charge-discharge performed in this process is typically 1 to 3.

The charging method may be a constant current charging method, a constant voltage charging method, or a combination thereof. For example, constant voltage charge and constant voltage charge may be repeated during single charge. The charging conditions are not particularly limited as long as the SEI film is formed. From the viewpoint of further improving the thickness uniformity of the SEI film, it is preferable to perform constant current charge, and then constant voltage charge.

The discharging method may be a constant current discharging method, a constant voltage discharging method, or a combination thereof. The discharge conditions are not particularly limited as long as the SEI film is formed. From the viewpoint of further improving the thickness uniformity of the SEI film, it is preferable to perform constant current discharge.

In the initial charge process, the secondary battery is typically maintained at a temperature in the range of 25° C. or higher and 100° C. or lower, preferably in the range of 35° C. or higher and 90° C. or lower, more preferably a temperature of 40° C. or higher and 85° C. or lower.

In the aging step, specifically, the SEI film is stabilized by a stabilization process. The process of stabilizing the SEI film is a process of stabilizing the SEI film by leaving the secondary battery subjected to the initial charge process in an open circuit state.

In the stabilization process, the temperature of the secondary battery is not particularly limited, and may be maintained in the range of 15° C. or higher and 80° C. or lower, for example. The secondary battery is preferably maintained at a temperature in the range of 20° C. or higher and 75° C. or lower, more preferably maintained at a temperature of 25° C. or higher and 70° C. or lower from the viewpoint of further stabilization of the SEI coating. Specifically, the temperature can be maintained within the range mentioned above by leaving the secondary battery in a space set at a constant temperature.

The leaving time in the stabilization process is not particularly limited as long as the stabilization of the SEI film is accelerated, and is typically 10 minutes to 30 days, and from the viewpoint of further stabilization of the SEI film, preferably falls within the range of 30 minutes to 14 days, more preferably within the range of 1 hour to 7 days.

The method for manufacturing a secondary battery according to the present invention only includes the preparation step and the application step as electrode manufacturing steps, and only includes the welding step, the housing step, the vacuum sealing step, the charge-discharge step, and the aging step as assembly steps.

In contrast, a conventional method for manufacturing a secondary battery including a binder-bonded electrode layer includes: as electrode manufacturing steps, a preparation step of preparing a coating liquid for electrode layer formation; a coating step of coating a current collector with the coating liquid for electrode layer formation; a drying step of drying the applied coating liquid for electrode layer formation; a pressing step of compressing the electrode layer; a slitting step of cutting the electrode into a desired width; and a cutting step of cutting the electrode cut into the desired width, into a desired shape and dimensions to form electrode plates, and includes: as assembly steps, a welding step of welding a tab to the electrode plates; a housing step of stacking the electrode plates such that a positive electrode plate and a negative electrode plate that constitute the electrode plates are alternately disposed with a separator interposed therebetween, and housing the stacked body with an exterior body material; a solution injection step of injecting an electrolytic solution into an exterior body that houses the stacked body; an impregnation step of impregnating the electrode with the electrolytic solution under vacuum; a vacuum sealing step of sealing exterior body; a charge-discharge step of forming a solid electrolyte interface film on the surface of the negative electrode active material by an initial charge process to form a secondary battery precursor; and an aging step of aging the secondary battery precursor.

Accordingly, in the method for manufacturing a secondary battery according to the present invention, both the electrode manufacturing steps and the assembly steps are greatly simplified, and dramatic reduction in capital investment and a reduction in manufacturing process cost can be achieved. In the secondary battery according to the present invention, the secondary battery manufacturing steps can be remarkably simplified, and the capital investment cost and the manufacturing process cost can be thus greatly reduced. The secondary battery according to the present invention is, because of allowing a reduction in resistance to be achieved without including any binder, also sufficiently excellent in rate characteristics.

EXAMPLES

<Manufacture of Secondary Battery>

Example 1: Semi-Solid Electrode-Type Secondary Battery

Preparation of Positive Electrode

A solution obtained by dissolving a lithium cobaltate (LCO) (D5=8.0 μm ($D5_M$)) of 15 μm in average particle size as a positive electrode active material, carbon black of 2.8 μm (D5=0.75 μm ($D5_A$)) in average particle size as a conductive aid, and a solution obtained by dissolving $LiPF_6$ at 1 M in a mixed solvent (EC:EMC=25:75 vol) as an electrolytic solution were subjected to a mixing and dispersing process so as to meet 78.5:1.5:20.0 in ratio by weight, thereby providing a fluid positive electrode layer slurry. The positive electrode layer slurry was applied in 10.0 cm×10.0 cm to one surface of a 15 μm-thick Al foil by a doctor blade method such that the capacity of the positive electrode active material was 5.0 mAh/cm$^2$ at one surface, thereby providing a positive electrode plate.

Preparation of Negative Electrode

Artificial graphite of 10.2 μm (D5=6.2 μm) in average particle size as a negative electrode active material and a solution obtained by dissolving $LiPF_6$ at 1 M in a mixed solvent (EC:EMC=25:75 vol) as an electrolytic solution were subjected to a mixing and dispersing process so as to meet 60.0:40.0 in ratio by weight, thereby providing a fluid negative electrode layer slurry. The negative electrode layer slurry was applied in 10.2 cm×10.2 cm to one surface of a 12 μm-thick Cu foil by a doctor blade method such that the capacity of the negative electrode active material was 5.4 mAh/cm$^2$ at one surface, thereby providing a negative electrode plate.

Preparation of Secondary Battery

The tab-welded positive electrode plate and negative electrode plate were bonded to each other with a separator (thickness: 20 μm) of 0.45 μm in pore diameter D95 value in an intermediate layer region interposed therebetween, sandwiched between aluminum laminates, and subjected to vacuum sealing. The battery was charged and discharged at 0.2 CA, then charged to a SOC of 70%, and subjected to an aging treatment at 55° C. for 24 hours to complete a secondary battery with a capacity of about 500 mAh. In the semi-solid positive electrode, the content of the binder was 0% with respect to the total amount of the semi-solid positive electrode layer in the secondary battery completed according to the present example. In the semi-solid negative electrode, the content of the binder was 0% with respect to the total amount of the semi-solid negative electrode layer in the secondary battery completed according to the present example.

In the secondary battery produced according to the present example, the conductive aid is included in the positive electrode, but is not included in the negative electrode, and thus, the negative electrode includes no conductive particles. For this reason, in the secondary battery, the specific particle-pore diameter relationship according to the present invention is achieved between the positive electrode and the separator disposed in contact with the positive electrode, but not achieved between the negative electrode and the separator disposed in contact with the negative electrode.

Example 2: Semi-Solid Electrode-Type Secondary Battery

A secondary battery was obtained by the same method as in Example 1, except that a positive electrode layer slurry obtained by the following method was used in the preparation of the positive electrode, and that a separator (thickness: 20 μm) of 0.85 μm in pore diameter D95 value in an intermediate layer region was used in the preparation of the secondary battery.

Carbon black particles (conductive aid) of 1.1 μm (D5=0.15 μm ($D5_A$)) in average particle size were integrated in a predetermined amount with a surface of a lithium cobaltate (LCO: positive electrode active material) (D5=8.0 μm ($D5_M$)) in advance by a mechanochemical treatment for applying strong mechanical stress between powder particles. Specifically, a lithium cobaltate (LCO: positive electrode active material), carbon black particles (conductive aid), and a polyvinylidene fluoride (PVdF: molecular weight of 300,000) were each put in a predetermined amount into a mechanical mixing apparatus (NOBILTA manufactured by HOSOKAWA MICRON CORPORATION), and mixed for 30 minutes to integrate the carbon black particles with the lithium cobalt oxide surface. The predetermined amounts of the positive electrode active material and conductive aid are amounts such that the ratio between the positive electrode active material of the positive electrode and the conductive aid in the secondary battery completed according to the present example is the same as the ratio between the positive electrode active material of the positive electrode and the conductive aid in the secondary battery completed according to Example 1. The predetermined amount of the PVdF is 0.13 parts by mass with respect to 100 parts by mass of the lithium cobaltate. The content of the binder containing the PVdF was 0.1% by mass or less with respect to the total amount of the semi-solid positive electrode layer in the secondary battery completed according to the present example.

A positive electrode layer slurry was obtained by the same method as the method for producing the positive electrode layer slurry in Example 1, except for using the obtained integrated product of the positive electrode active material and conductive aid particles. Specifically, the obtained integrated product of the positive electrode active material and conductive aid particles, and a solution obtained by dissolving $LiPF_6$ at 1 M in a mixed solvent (EC:EMC=25:75 vol) as an electrolytic solution subjected to a mixing and dispersing process so as to meet the active material:the conductive aid:the binder:the solvent=78.4:1.5:0.1:20.0 in ratio by weight, thereby providing a fluid positive electrode layer slurry.

In the semi-solid negative electrode, the content of the binder was 0.1% by mass or less with respect to the total amount of the semi-solid negative electrode layer in the secondary battery completed according to the present example.

In the secondary battery produced according to the present example, the conductive aid is included in the positive electrode with the conductive aid integrated with the surface of the positive electrode active material, but is not included in the negative electrode, and thus, the negative electrode includes no conductive particles. For this reason, in the secondary battery, the specific particle-pore diameter relationship according to the present invention is achieved between the positive electrode and the separator disposed in contact with the positive electrode, but not achieved between the negative electrode and the separator disposed in contact with the negative electrode.

Comparative Example 1: Binder-bonded Electrode-type Secondary Battery

Preparation of Positive Electrode

A lithium cobaltate (LCO) (D5=8.0 μm ($D5_M$)) of 15 μm in average particle size as a positive electrode active material, carbon black of 1 μm in average particle size as a conductive aid, and PVdF as a binder were dispersed in NMP so as to meet 96:2:2 in ratio by weight, thereby providing a positive electrode slurry. Then, the slurry was applied onto one surface of a 15 μm-thick Al foil with the use of a die coater such that the capacity of the active material was 5.0 mAh/cm$^2$ at one surface, dried, then compressed with the use of a roll press machine such that the porosity was 18%, and slit and cut to obtain a positive electrode plate of 10.0 cm×10.0 cm.

Preparation of Negative Electrode

Artificial graphite of 10 μm in average particle size as a negative electrode active material, flaky graphite of 3 μm in average particle size as a conductive aid, and CMC and SBR as binders were dispersed in water to meet 96:1:3 (1.5+1.5) in ratio by weight to obtain a negative electrode slurry. Then, the slurry was applied onto one surface of a 12 μm-thick Cu foil with the use of a die coater such that the capacity of the active material was 5.4 mAh/cm$^2$ at one surface, dried, then compressed with the use of a roll press machine such that the porosity was 23%, and slit and cut to obtain a negative electrode plate of 10.2 cm×10.2 cm.

Preparation of Secondary Battery

The tab-welded positive electrode plate and negative electrode plate were bonded to each other with a separator of 0.85 μm in pore diameter D95 value in an intermediate layer region (a separator similar to the separator used in Example 2) interposed therebetween, sandwiched between aluminum laminates, filled with an injected electrolytic solution (solution obtained by dissolving $LiPF_6$ at 1 M in a mixed solvent (EC:EMC=25:75 vol)), and subjected to vacuum impregnation, and then to vacuum sealing. The battery was charged and discharged at 0.2 CA, then charged to a SOC of 70%, and subjected to an aging treatment at 55° C. for 24 hr to complete a secondary battery with a capacity of about 500 mAh.

In the semi-solid negative electrode, the content of the binder was 0.01% by mass or less with respect to the total amount of the semi-solid negative electrode layer in the secondary battery completed according to the present example.

Comparative Example 2: Semi-Solid Electrode-Type Secondary Battery

A secondary battery was obtained by the same method as in Example 1, except that a positive electrode layer slurry obtained by the following method was used in the preparation of the positive electrode, and that a separator of 0.85 μm in pore diameter D95 value in an intermediate layer region (a separator similar to the separator used in Example 2) was used in the preparation of the secondary battery.

A solution obtained by dissolving a lithium cobaltate (LCO) (D5=8.0 μm ($D5_M$)) of 15 μm in average particle size as a positive electrode active material, carbon black of 1.1 μm (D5=0.15 μm ($D5_A$)) in average particle size as a conductive aid, and a solution obtained by dissolving $LiPF_6$ at 1 M in a mixed solvent (EC:EMC=25:75 vol) as an electrolytic solution were subjected to a mixing and dispersing process so as to meet 78.5:1.5:20.0 in ratio by weight, thereby providing a fluid positive electrode layer slurry.

<Measurement and Evaluation>

(Minimum Particle Diameter D5 Value)

While applying an ultrasonic wave to a sample, the sample was dispersed in NMP, the particle size distribution was measured with the use of a laser diffraction/scattering type particle size distribution measuring apparatus (LA-960 manufactured by HORIBA, Ltd.), and the D5 value was obtained from the result.

For example, the minimum particle diameter $D5_M$ was obtained with the use of the active material as the sample.

In addition, for example, the minimum particle diameter $D5_A$ was obtained with the use of the conductive aid as the sample.

In addition, for example, the minimum particle diameter $D5_P$ of the conductive particles was obtained with the use of the integrated product of the positive electrode active material and conductive aid particles as the sample.

(Maximum Pore Diameter D95 Value of Separator)

A section of the separator was exposed by FIB processing (Focused Ion Beam) while cooling, and a sectional image was obtained by SEM observation. In the sectional image, the pore size distribution of an intermediate layer region obtained by removing regions corresponding to 15% respectively at both ends (that is, upper and lower ends) was measured with the use of image analysis software (ImageJ (Wayne Rasband (NIH)), and the D95 value was obtained from the result.

(Short Circuit Ratio)

The presence or absence of any electrical short circuit was checked for each of the various secondary batteries completed, and the short circuit ratio was determined. In the preparation of the cell, the separator is impregnated with the electrolytic solution included in the electrode, and thus, when the electrolytic solution includes therein conductive aid particles smaller than the pore sizes of the separator, an initial short circuit may be caused although the probability is low, and is thus expressed.

(Rate Characteristics)

The capacity retention ratio X (0.2 CA discharge capacity ratio) was measured when the various secondary batteries completed were discharged at 2 CA at 25° C.

⊙⊙; 85%<X (best);

⊙; 80%<X≤85% (excellent);

o; 70%<X≤80% (good);

Δ: 50%<X≤70% (no practical problem); and x; X≤50% (practical problem).

(Cycle Characteristics)

The 0.2 CA capacity retention ratio Y was measured when 300 cycles of full charge-discharge (3.00 V to 4.35 V) at a current of 0.5 CA at 35° C. were repeated with the use of the various secondary batteries completed. The 0.2 CA capacity retention ratio Y is, specifically, the ratio of the 0.2 CA discharge capacity at the 300-th cycle to the 0.2 CA discharge capacity at the first cycle.

⊙⊙; 85%<Y (best);

⊙; 80%<Y 85% (excellent);

o; 70%<Y 80% (good);

Δ: 50%<Y 70% (no practical problem); and x; Y 50% (practical problem).

Various evaluation levels and evaluation results are shown in Table 1.

prepared by the normal method, has the results of high resistance and poor rate characteristics and cycle characteristics.

According to Comparative Example 2 with the fluid electrode used without including any binder, the secondary battery manufacturing steps can be remarkably simplified, and the 2 CA capacity retention ratio can be improved, but the minimum particle diameter of the conductive particles and the maximum pore diameter of the separator fail to satisfy the predetermined relationship. For this reason, the short circuit ratio is high, and the cycle characteristics are poor.

Example 1 in which the conductive aid and the separator were changed such that the minimum particle diameter of the conductive particles and the maximum pore diameter of the separator successfully satisfied the predetermined relationship is sufficiently excellent in short circuit ratio, rate characteristics, and cycle characteristics.

Further, according to Example 2, the use of the conductive particles attached to and integrated with the surface of the active material allows the relationship between the minimum particle diameter and the maximum pore diameter to

TABLE 1

| | | Positive Electrode | | | | Negative | Separator Intermediate |
|---|---|---|---|---|---|---|---|
| No. | Electrode Type | Active Material $D5_M$ Value[(1)] (μm) | Conductive Aid $D5_A$ Value[(2)] (μm) | Presence or Absence of Conductive Aid Integrated | Conductive Particle $D5_P$ Value[(3)] (μm) ( $D5_P$-D95) | Electrode Active Material $D5_M$ Value[(1)] (μm) | Layer Region Pore Diameter D95 Value (μm) |
| Comparative Example 1 | Binder-bonded Type | 8.0 | 0.15 | Absence | 0.15 (−0.7) | 6.2 | 0.85 |
| Comparative Example 2 | Semi- | | 0.15 | Absence | 0.15 (−0.7) | | 0.85 |
| Example 1 | solid | | 0.75 | Absence | 0.75 (0.3) | | 0.45 |
| Example 2 | Type | | 0.15 | Presence | 8.3 (7.45) | | 0.85 |

| No. | The Number of Manufacturing Steps | Short Circuit Ratio (%) | Rate Characteristics: 2CA Capacity Retention Ratio (%) | Cycle Characteristics: Capacity Retention Ratio after 300 cycles (%) |
|---|---|---|---|---|
| Comparative Example 1 | Electrode: 6*1 Assembly: 7*2 | 0 | 9× | 33× |
| Comparative Example 2 | Electrode: | 7 | 85⊙ | 46× |
| Example 1 | 2*3 | 0 | 83⊙ | 90⊙⊙ |
| Example 2 | Assembly: 5*4 | 0 | 86⊙⊙ | 89⊙⊙ |

The symbols in Table 1 are as follows.

[(1)]the D5 value of the active material used.

[(2)]the D5 value of the conductive aid used.

[(3)]the D5 value of the conductive particles in the electrode layer.

*1 preparation, coating, drying, pressing, slitting (cutting) (the slitting is a step that have the same meaning as the cutting)

*2 tab welding, sandwiching between laminates, solution injection, vacuum impregnation, vacuum sealing, charge-discharge, aging

*3 preparation, application

*4 tab welding, sandwiching between laminates, vacuum sealing, charge-discharge, aging According to all of the examples and comparative examples, the secondary batteries were prepared in the regions with a very large basis weight of 5.0 mAh/cm$^2$. For this reason, Comparative Example 1 including the binder, be satisfied also with the use of the conductive particles smaller than the maximum pore diameter of the separator, and the same advantageous effect as in Example 1 is thus obtained.

The secondary battery according to the present invention can be used in various fields in which battery use or power storage is assumed. By way of example only, the secondary battery according to the present invention can be used in the field of electronics mounting. The secondary battery according to an embodiment of the present invention can also be used in the fields of electricity, information, and communication in which mobile equipment, and the like are used (for example, electric and electronic equipment fields or mobile equipment fields including mobile phones, smartphones, smartwatches, notebook computers and digital cameras, activity meters, arm computers, electronic papers, and small electronic machines such as wearable devices, RFID tags, and card-type electronic money), home and small industrial applications (for example, the fields of electric tools, golf carts, and home, nursing, and industrial robots), large industrial applications (for example, fields of forklift, elevator, and harbor crane), transportation system fields (field of, for example, hybrid automobiles, electric automobiles, buses, trains, power-assisted bicycles, and electric two-wheeled vehicles), power system applications (for example, fields such as various types of power generation, road conditioners, smart grids, and household power storage systems), medical applications (medical equipment fields such as earphone hearing aids), pharmaceutical applications (fields such as dosage management systems), IoT fields, space and deep sea applications (for example, fields such as a space probe and a research submarine), and the like.

The invention claimed is:

1. A secondary battery comprising:

a semi-solid electrode including an electrode active material, a conductive aid including conductive particles, and an electrolytic solution; and a separator in contact with the semi-solid electrode, wherein a minimum particle diameter $D5_P$ (μm) of the conductive particles included in the conductive aid of the semi-solid electrode is larger than a maximum pore diameter D95 (μm) of an intermediate layer region of the separator.

2. The secondary battery according to claim 1, wherein the conductive particles include the conductive aid, integrated particles of the conductive aid integrated with a surface of the electrode active material, or a mixture of the conductive aid and the electrode active material.

3. The secondary battery according to claim 1, wherein the intermediate layer region is a region excluding regions corresponding to 15% of a thickness of the separator respectively at both ends in a thickness direction in a section parallel to the thickness direction of the separator.

4. The secondary battery according to claim 1, wherein the semi-solid electrode includes a semi-solid positive electrode and a semi-solid negative electrode, and a relationship between the minimum particle diameter $D5_P$(μm) and the maximum pore diameter D95 (μm) is between at least one electrode of the semi-solid positive electrode or the semi-solid negative electrode and the separator disposed in contact with the at least one electrode.

5. The secondary battery according to claim 1, wherein, when the conductive aid has a minimum particle diameter $D5_A$(μm) that is equal to or less than the maximum pore diameter D95 (μm) of the intermediate layer region of the separator, the conductive aid comprises integrated particles of the conductive aid integrated with a surface of the electrode active material.

6. The secondary battery according to claim 1, wherein the minimum particle diameter $D5_P$ (μm) of the conductive particles and the maximum pore diameter D95 (μm) of the intermediate layer region of the separator satisfy: $0.1 \leq D5_P - D95 \leq 10$.

7. The secondary battery according to claim 1, wherein the minimum particle diameter $D5_P$ of the conductive particles is 0.3 μm to 15 μm.

8. The secondary battery according to claim 7, wherein the maximum pore diameter D95 of the intermediate layer region of the separator is 0.2 μm to 5 μm.

9. The secondary battery according to claim 1, wherein the minimum particle diameter $D5_P$ (μm) of the conductive particles and the maximum pore diameter D95 (μm) of the intermediate layer region of the separator satisfy: $1 \leq D5_P - D95 \leq 9$.

10. The secondary battery according to claim 9, wherein the minimum particle diameter $D5_P$ of the conductive particles is 1 μm to 10 μm.

11. The secondary battery according to claim 1, wherein the maximum pore diameter D95 of the intermediate layer region of the separator is 0.2 μm to 5 μm.

12. The secondary battery according to claim 1, wherein a capacity per area of the semi-solid electrode is 4 $mAh/cm^2$ or more.

13. The secondary battery according to claim 1, wherein a content of a binder in the semi-solid electrode is 0.1% by mass or less with respect to a total amount of a semi-solid electrode layer.

14. The secondary battery according to claim 1, wherein the semi-solid electrode has an electrode layer capable of occluding and releasing lithium ions.

15. The secondary battery according to claim 1, wherein an average particle size of the conductive aid is 0.1 μm to 20 μm.

16. The secondary battery according to claim 1, wherein a minimum particle diameter $D5_A$ of the conductive aid is 0.01 μm to 10 μm.

17. The secondary battery according to claim 1, wherein a content of the conductive aid included in the semi-solid electrode is 0.1% by weight to 10% by weight with respect to a total amount of the semi-solid electrode.

18. A method for manufacturing a secondary battery, the method comprising:

mixing an electrode active material, a conductive aid including conductive particles, and an electrolytic solution to prepare a slurry for an electrode layer;

applying the slurry for the electrode layer to a current collector to form electrode plates;

welding a tab to the electrode plates;

stacking the electrode plates such that a positive electrode plate and a negative electrode plate are alternately disposed with a separator disposed therebetween to form a stacked body;

housing the stacked body in an exterior body material;

sealing the exterior body material and evacuating an inside of an exterior body;

forming a solid electrolyte interface film on a surface of a negative electrode active material by an initial charge process to form a secondary battery precursor; and aging the secondary battery precursor, wherein a minimum particle diameter $D5_P$ (μm) of the conductive particles included in the conductive aid is larger than a maximum pore diameter D95 (μm) of an intermediate layer region of the separator.

19. The method for manufacturing a secondary battery according to claim 18, wherein the minimum particle diameter $D5_P$ (μm) of the conductive particles and the maximum pore diameter D95 (μm) of the intermediate layer region of the separator satisfy: $0.1 \leq D5_P - D95 \leq 10$.

20. The method for manufacturing a secondary battery according to claim 18, wherein the minimum particle diameter $D5_P$ of the conductive particles is 0.3 μm to 15 μm, and the maximum pore diameter D95 of the intermediate layer region of the separator is 0.2 μm to 5 μm.

* * * * *